US012172883B2

(12) United States Patent
Jessie et al.

(10) Patent No.: US 12,172,883 B2
(45) Date of Patent: Dec. 24, 2024

(54) SYSTEMS, METHODS, AND DEVICES FOR DISPENSING FLUID

(71) Applicant: Starbucks Corporation, Seattle, WA (US)

(72) Inventors: Jeffrey Lynn Jessie, Snohomish, WA (US); Lucas Sano Abrahamsen, Seattle, WA (US); Paul Stack, Dublin (IE); Joanne Lombard, Dublin (IE); Brian Byrne, Dublin (IE); Peter Treston, Dublin (IE); John Kelly, Wicklow (IE)

(73) Assignee: Starbucks Corporation, Seattle, WA (US)

( * ) Notice: Subject to any disclaimer, the term of this patent is extended or adjusted under 35 U.S.C. 154(b) by 1 day.

(21) Appl. No.: 18/069,155

(22) Filed: Dec. 20, 2022

(65) Prior Publication Data

US 2024/0199404 A1 Jun. 20, 2024

(51) Int. Cl.
*B67D 3/00* (2006.01)

(52) U.S. Cl.
CPC ......... *B67D 3/0003* (2013.01); *B67D 3/0067* (2013.01); *B67D 3/0077* (2013.01)

(58) Field of Classification Search
CPC ... B67D 3/0003; B67D 3/0067; B67D 3/0077
See application file for complete search history.

(56) References Cited

U.S. PATENT DOCUMENTS

| | | | | |
|---|---|---|---|---|
| 4,515,294 | A * | 5/1985 | Udall | B65D 77/065 222/105 |
| 6,708,741 | B1 | 3/2004 | Berry et al. | |
| 10,373,477 | B1 * | 8/2019 | Bonner | A47K 5/12 |
| 2012/0067920 | A1 * | 3/2012 | Veltrop | B67D 3/0003 222/64 |
| 2012/0068093 | A1 | 3/2012 | Veltrop et al. | |
| 2016/0068380 | A1 | 3/2016 | Rege et al. | |
| 2018/0290875 | A1 * | 10/2018 | Swears | B67D 3/0083 |
| 2018/0321072 | A1 * | 11/2018 | Williams | B65D 51/24 |
| 2019/0112174 | A1 * | 4/2019 | Alix | B67D 1/0001 |
| 2020/0189902 | A1 * | 6/2020 | Burrows | G01M 3/32 |
| 2022/0007898 | A1 * | 1/2022 | Affan | G06Q 30/0633 |

FOREIGN PATENT DOCUMENTS

| | | | | |
|---|---|---|---|---|
| EP | 3939933 | A1 * | 1/2022 | B67D 1/0888 |
| KR | 20060069961 | A * | 6/2006 | |

* cited by examiner

*Primary Examiner* — Bob Zadeh
(74) *Attorney, Agent, or Firm* — Knobbe, Martens, Olson & Bear, LLP

(57) ABSTRACT

A dispenser may dispense a predetermined amount of fluid from a fluid container. The dispenser may include an actuator that applies a force to a nozzle of the fluid container to open the nozzle for a period of time based. The period of time may be based on the predetermined amount of fluid. The dispenser may include a weight sensor, wherein the weight sensor detects a weight of the fluid in a fluid container. The period of time may be based on the weight of the fluid in the fluid container.

20 Claims, 12 Drawing Sheets

SYSTEMS, METHODS, AND DEVICES FOR DISPENSING FLUID

FIELD

The present disclosure relates to systems, methods, and devices for dispensing fluids, such as, in certain embodiments, systems and methods for dispensing fixed amounts of prepackaged fluid with a mechanical nozzle.

BACKGROUND

Fluids, such as fluidic foods or beverage components, can be added to beverages or foods to enhance or modify a flavor of the beverages or foods. Fluids are currently dispensed with automatic electronic dispensers that require users to remove the fluid from its original packaging. Components of the automatic electronic dispenser require frequent cleaning since the components contact the fluid.

SUMMARY

For purposes of this summary, certain aspects, advantages, and novel features of the invention are described herein. It is to be understood that not all such advantages necessarily may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

In some embodiments, a fluid dispenser can include: a first actuator; a second actuator; and a sensor, wherein the sensor provides a signal that relates to a fluid in a fluid container, wherein when a user engages the first actuator, the second actuator opens a mechanical nozzle of the fluid container for a period of time to dispense, through a hole in the fluid dispenser, a predetermined amount of fluid from the fluid container, wherein the period of time is based on the signal from the sensor.

In some embodiments, the second actuator can be a linear actuator.

In some embodiments, the second actuator can apply a force to the mechanical nozzle to open the mechanical nozzle.

In some embodiments, the mechanical nozzle can include a mechanical actuator configured to open the mechanical nozzle, and the second actuator can contact the mechanical actuator when the second actuator applies a force to the mechanical nozzle.

In some embodiments, the fluid dispenser can include a clamp configured to secure the mechanical nozzle in place when the second actuator applies the force to the mechanical nozzle.

In some embodiments, the clamp can apply a force to the mechanical nozzle in a direction opposite to the force applied by the second actuator such that the clamp can secure the mechanical nozzle in place.

In some embodiments, a controller can determine the period of time.

In some embodiments, the sensor can be a weight sensor, and the signal can relate to a weight of the fluid in the fluid container.

In some embodiments, a controller can determine the period of time based on a look up table including weights of the fluid in the container.

In some embodiments, a controller can determine the period of time based on a first weight of the fluid in the container and a second weight of the fluid in the container, wherein the first weight of the fluid in the container is a weight of the fluid in the container before the second actuator opens the mechanical nozzle, and the second weight of the fluid in the container is the weight of the fluid in the container after the mechanical nozzle dispenses the predetermined amount of fluid.

In some embodiments, the fluid dispenser can be gravity fed.

In some embodiments, a fluid dispensing system can include: a housing configured to receive a fluid container including a mechanical nozzle, the housing including: a first actuator, wherein the first actuator is a mechanical actuator; a base including a hole; a cover coupled to the base, wherein when the fluid container receives the fluid container, the mechanical nozzle is substantially aligned with the hole; an actuation system including: a controller; a second actuator; and a sensor, wherein the sensor provides a signal that relates to a fluid in a fluid container; wherein when a user engages the first actuator, the controller instructs the second actuator to apply a force to the mechanical nozzle for a period of time, wherein the force opens the mechanical nozzle to dispense a predetermined amount of fluid from the fluid container, wherein the controller determines the period of time based the signal from the sensor.

In some embodiments, the system can include a clamp configured to secure the mechanical nozzle in place when the second actuator applies the force to the mechanical nozzle.

In some embodiments, the period of time can not be based on how long the user engages the first actuator.

In some embodiments, the sensor can be a weight sensor, and the signal relates to a weight of the fluid in the fluid sensor.

In some embodiments the controller can determine the period of time based on a look up table including weights of the fluid in the container.

In some embodiments, the controller can determine the period of time based on a first weight of the fluid in the container and a second weight of the fluid in the container, wherein the first weight of the fluid in the container is the weight of the fluid in the container before the second actuator opens the mechanical nozzle, and the second weight of the fluid in the container is the weight of the fluid in the container after the mechanical nozzle dispenses the predetermined amount of fluid.

In some embodiments, the fluid container can be a bag-in-box container.

In some embodiments, a method of dispensing a predetermined amount of fluid can include: placing, by a user, a fluid container on a weight sensor coupled to a base of a dispenser, wherein the fluid container includes a mechanical nozzle, and the base includes a hole; aligning, by the user, the mechanical nozzle with the hole and an electronic actuator of the dispenser; closing, by the user, a clamp configured to secure the mechanical nozzle in place; engaging, by the user, a mechanical actuator of the dispenser; determining, by a controller, a period of time, wherein the period of time is based on a weight of fluid in the fluid container detected by the weight sensor, and the predetermined amount of fluid; instructing, by the controller, the electronic actuator to apply a force to the mechanical nozzle to open the mechanical nozzle and dispense fluid; and after the period of time, instructing, by the controller, the electronic actuator to stop applying the force to the mechanical nozzle to close the nozzle.

In some embodiments, the controller can determine the period of time based on a look up table.

In some embodiments, the controller can determine the period of time based on a first weight of the fluid in the container and a second weight of the fluid in the container, wherein the first weight of the fluid in the container is the weight of the fluid in the container before the electronic actuator opens the mechanical nozzle, and the second weight of the fluid in the container is the weight of the fluid in the container after the mechanical nozzle dispenses the predetermined amount of fluid.

In some embodiments, fluid container can be a bag-in-box container.

In some embodiments, the user can place a weight on a bag of the bag-in-box container.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure.

DETAILED DESCRIPTION

Figure 1A:
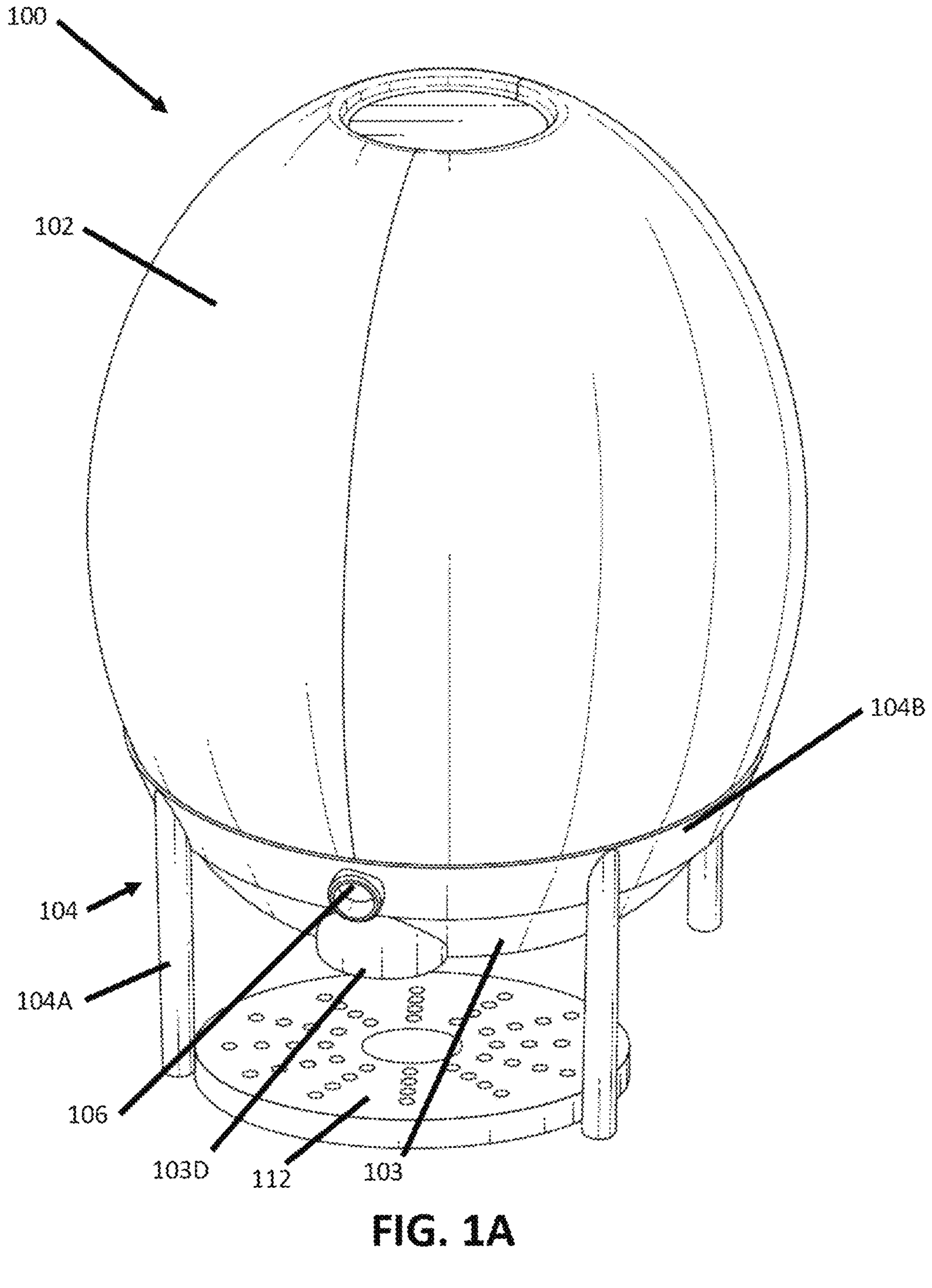
FIG. 1A illustrates a perspective view of an embodiment of a dispenser.
Figure 1B:
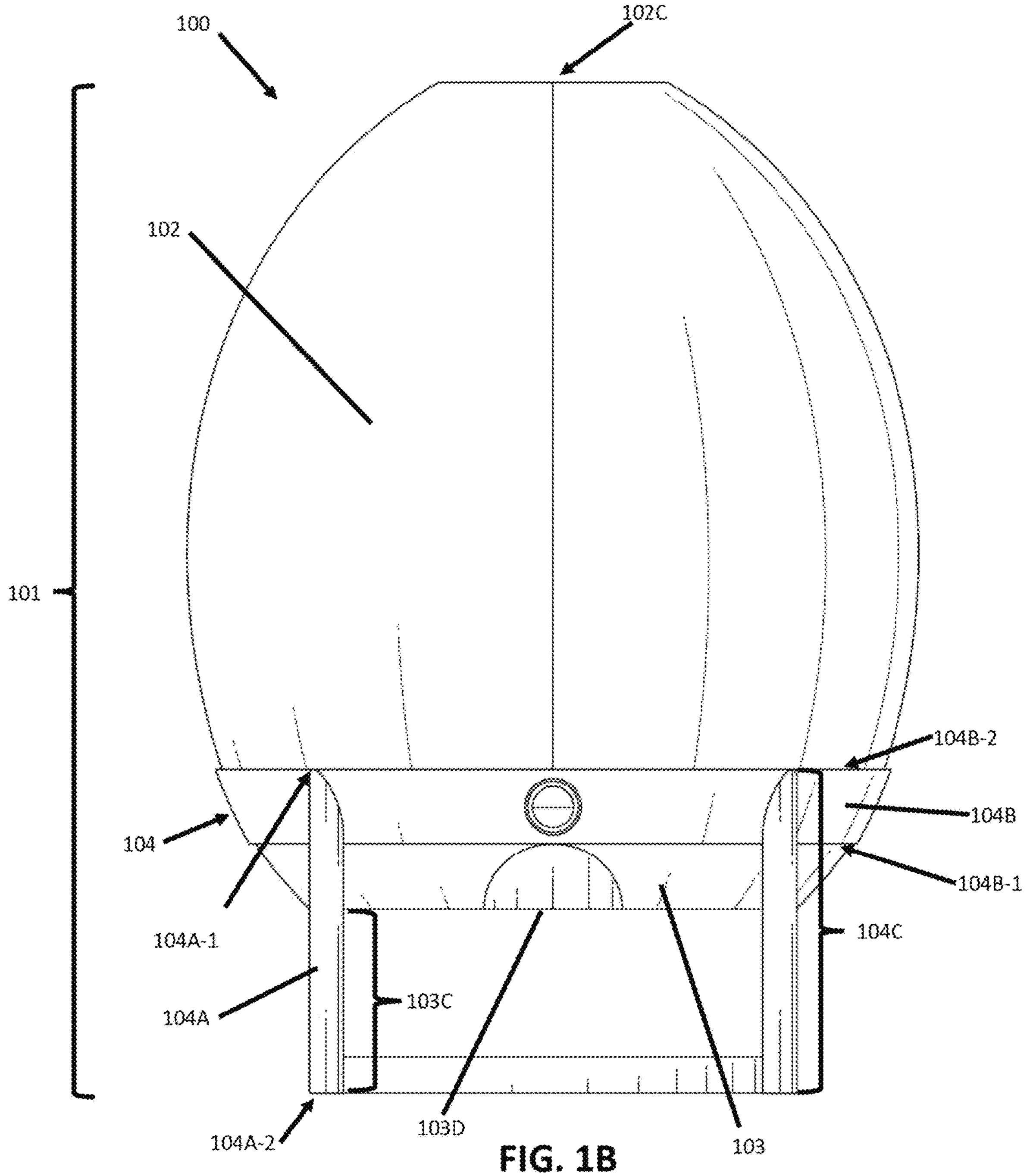
FIG. 1B illustrates a front view of the dispenser of FIG. 1A.

In order to dispense a prepackaged fluid with a mechanical nozzle of the packaging, usually a user must manually engage the mechanical nozzle to open and close the mechanical nozzle to dispense an amount of fluid. However, manually engaging the mechanical nozzle may be inaccurate leading to a large variation in the amount of fluid dispensed from the mechanical nozzle. If the fluid is edible, such as a fluidic food or beverage ingredient, the quality of the beverage or food containing the fluid may be inconsistent across multiple orders. Additionally, as the amount of fluid in the packaging decreases, the flow rate of fluid out of the mechanical nozzle may decrease, further decreasing consistency of the amount of fluid dispensed.

To increase the consistency of the amount of fluid dispensed, an electronic dispenser that can dispense a fixed amount of fluid can be used. If the fluid is in a prepackaged container, such as a bag-in-box, usually the fluid must be removed from the container and transferred to the electronic dispenser. When the fluid is transferred to the electronic dispenser the fluid may be spilled. If the fluid is different from the fluid previously in the electronic dispenser, the electronic dispenser must be cleaned to prevent cross contamination, which may decrease throughput of beverages or food. If the electronic dispenser is used in a coffee store or other food service establishment, parts of the electronic dispenser that contact the fluid must be cleaned according to local code or regulations. Frequent cleaning of the electronic dispenser may be labor intensive and can cause the coffee store or other food service establishment to fall behind on beverage or food orders due to the decreased throughput.

In accordance with several embodiments, the systems, methods, and devices described herein advantageously may dispense a fixed amount of fluid from the prepackaged container without the fluid coming into contact with the dispenser. The dispenser may be an automated dispenser that can dispense the fixed amount of fluid from the prepackaged container using the mechanical nozzle of the container. The dispenser may convert manual actuation from a user into electronic actuation of the mechanical nozzle. The dispenser may use sensors to determine a weight of fluid in the container to determine how long to open the mechanical nozzle to dispense the fixed amount of fluid. As the weight or amount of fluid in the container decreases, the dispenser can automatically adjust how long the mechanical nozzle is opened such that the fixed amount of fluid is dispensed no matter how much fluid remains in the container.

FIGS. 1A-1D illustrate a dispenser 100 according to an embodiment of the present disclosure. The dispenser 100 may dispense a fluid such as fluidic foods and/or beverage components. The fluid may be oil and/or any other fluidic food or beverage component. The dispenser 100 may include a cover 102, a base 103, and a stand 104. The cover 102 may be a housing. The stand 104 may include legs 104A and ring 104B. In some embodiments, the stand 104 may include a one (1) leg 104A, two (2) legs 104A, three (3) legs 104A, four (4) legs 104A, five (5) legs 104A, or six (6) legs 104A. In the illustrated embodiment, the stand 104 includes four (4) legs 104A. In some embodiments, the legs 104A may extend from the ring 104B. In some embodiments, the legs 104A may extend from an outer surface 104B-1 the ring 104B. The legs 104A may extend from a proximal end 104A-1 to a distal end 104A-2. The legs 104A may hold up a top edge 104B-2 of the ring 104B at a height 104C from a surface when a distal end 104A-2 of the legs 104A are placed on the surface.

In some embodiments, an opening of the stand 104 may be defined by the ring 104B. In some embodiments, the opening of the stand 104 may be a circle, a square, a rectangle, a triangle, a semicircle, an ellipse, and/or any other shape. In some embodiments, the top edge 104B-2 may have a diameter that is larger than a diameter of a bottom edge 104B-3 of the ring 104B such that the ring 104B forms an angle from a vertical axis, wherein the vertical axis is defined as an axis from a bottom 100A of the dispenser 100 to a top 100B of the dispenser. In some embodiments, the base 103 may be placed through an opening of the stand 104. In some embodiments, sidewall 103A of the base 103 form an angle with a bottom surface 103B of the base 103. The angle formed by the sidewall 103A and the bottom surface 103B may be a same angle the ring 104B forms with the vertical axis. In this way, when the base 103 is place through the opening of the stand 104, the sidewall 103A may contact the ring 104B and the ring 104B may hold the bottom surface 103B a height 103C from a surface when the stand 104 is placed on the surface. In some embodiments, the height 103C may be 1 inch, 2 inches, 3 inches, 4 inches, 5 inches, 6 inches, 7 inches, 8 inches, 9 inches, 10 inches, 11 inches, 12 inches, 15 inches, 20 inches, 25 inches, 30 inches, and/or any value between the aforementioned values.

In some embodiments, the base 103 may include a dispensing hole 103D. The dispensing hole 103D may be positioned at an outer edge of the bottom surface 103B. In some embodiments, the dispensing hole 103D may be a circle, a square, a rectangle, a triangle, a semicircle, an ellipse, and/or any other shape. The dispensing hole 103D may be configured to receive a nozzle of a fluid container. In some embodiments, the dispensing hole 103D may be sized such that the base 103 does not contact the nozzle of the fluid container so no portion of the dispenser 100 contacts fluid. In this way, the dispenser 100 does not require cleaning.

In some embodiments, the dispensing hole 103D may include a light 103E. The light 103E may be an LED light. In some embodiments, the light 103E may the same shape as the dispensing hole 103D. In some embodiments, the light 103E may be a ring-shaped light. The light 103E may be configured to light up a beverage container when a user places the beverage container below the dispensing hole 103D. In some embodiments, the base 103 may include a sensor 103F (shown schematically in FIG. 2F) near the dispensing hole 103D. The sensor 103F may be configured to determine when a user places the beverage container below the dispensing hole 103D. In some embodiments, when the sensor 103F determines a beverage container is below the dispensing hole 103D, the sensor 103F may be configured to turn on the light 103E. In some embodiments, the light 103E may turn on in response to a user pressing a user actuator 106 of the dispenser 100.

In some embodiments, the light 103E may pulse, change color, or otherwise indicate when a fluid container placed in the dispenser 100 is empty. In some embodiments, the light 103E may pulse, change color, or otherwise indicate when an amount of fluid in the fluid container or a weight of the fluid container is below a predetermined threshold.

In some embodiments, the user actuator 106 may be on a sidewall 103A, the ring 104B and/or the cover 102. In some embodiments, the user actuator 106 may be a push button or any other actuator such as a mechanical actuators (such as a switch, slide, rotary gear, cam, or linkage) or non-mechanical actuators such as an optical switch. In some embodiments, the user actuator 106 may be an electrical actuator. In some embodiments, the user actuator 106 may include a capacitive surface. In some embodiments, as described further below with reference to FIGS. 2A-3, when a user presses on, engages, or otherwise actuates the user actuator 106, the dispenser 100 may dispense a fluid from the fluid container through the dispensing hole 103D. In some embodiments, the dispenser 100 may be gravity fed.

In some embodiments, a user may place a fluid container 300 (illustrated partially in FIG. 2A) on an inner surface 103B-1 of the bottom surface 103B of the base 103. The user may place the fluid container 300 on the inner surface 103B-1 such that the nozzle of the fluid container is aligned with and/or extends into the dispensing hole 103D.

In some embodiments, the user can place the cover 102 over the fluid container and couple the cover 102 to the ring 104B and/or the base 103. In this way, the cover 102 may hide or conceal the fluid container 300 so the fluid container 300 is not visible when the dispenser 100 is in use. In some embodiments, the base 103 may include one or more fasteners 108. The one or more fasteners 108 may be configured to couple the cover 102 to the base 103.

Figure 1C:
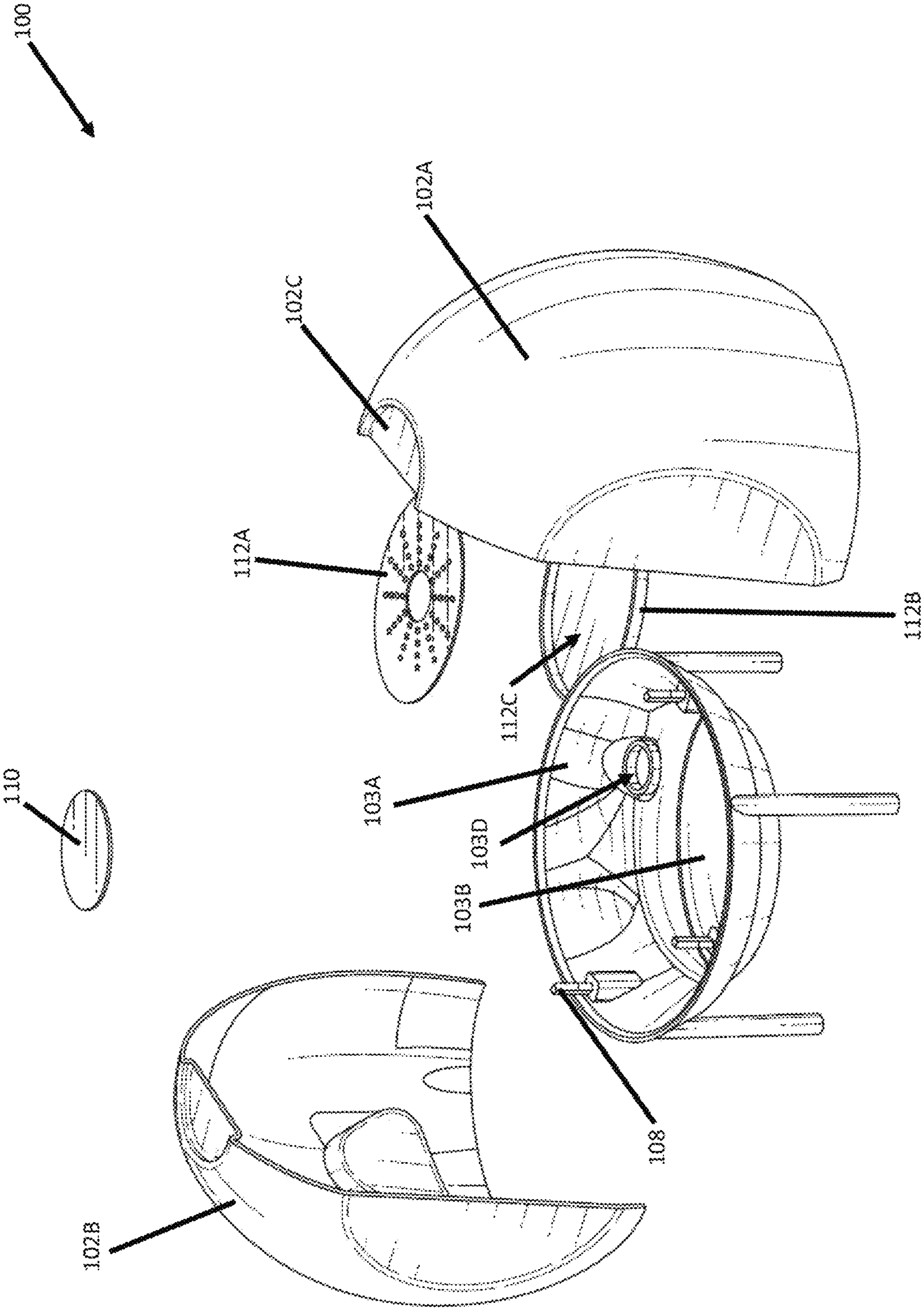
FIG. 1C illustrates an exploded perspective view of an embodiment of a dispenser shown in FIG. 1A.
Figure 1D:
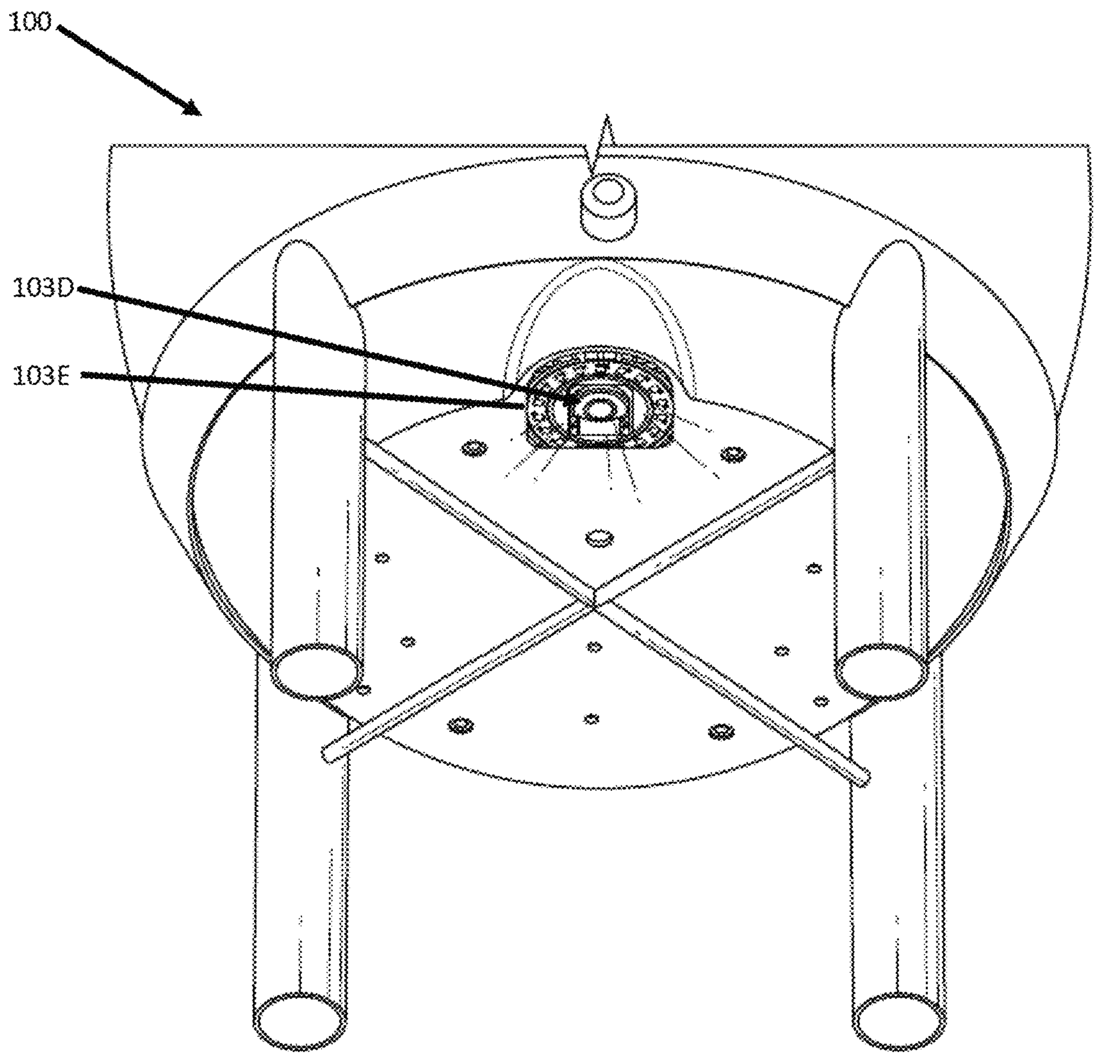
FIG. 1D illustrates another view of the dispenser of FIG. 1A.

In some embodiments, as shown in FIG. 1C, the cover 102 can include a first half 102A and a second half 102B. The first half 102A and the second half 102B may be coupled together to form the cover 102. In some embodiments, the dispenser may include a disc 110. In some embodiments, the disc 110 may be place on a top surface 102C of the cover 102. In some embodiments, the disc 110 may couple the halves 102A, 102B of the cover 102 together.

In some embodiments, the dispenser 100 can include a tray 112. The tray 112 may be placed under the base 103. In some embodiments, the tray 112 may be placed under the dispensing hole 103D. The tray 112 may be configured to hold the beverage container when the beverage container is placed under the dispensing hole 103D. In some embodiments, the tray 112 may include a top surface 112A and a tray base 112B. In some embodiments, the top surface 112A may support the beverage container when the user places the beverage container under the dispensing hole 103D. the top surface 112A may include one or more openings 112A-1. The one or more openings 112A-1 may allow for fluid dispensed by the dispenser 100 that is not received by the beverage container to flow into an inner volume 112C of the tray 112. The inner volume 112C may be formed by the top surface 112A and the tray base 112B.

In some embodiments, the cover 102, the base 103, the stand 104, the disc 110 and/or the tray 112 may include brass, brushed brass, steel, aluminum, wood, plastic, and/or any other hard material. In some embodiments, the cover 102, the base 103, the stand 104, the disc 110 and/or the tray 112 may be 3D printed, vacuum formed, stamped, punched, injection molded, and/or blow molded.

In some embodiments, the dispenser 100 may include a height 101. The height 101 may be a distance from the distal end 104A-2 of the legs 104A to the top surface 102C of the cover 102. In some embodiments, the height 101 may be 5 inches, 10 inches, 15 inches, 20 inches, 25 inches, 30 inches, 35 inches, 40 inches, 45 inches, 50 inches, and/or any value between the aforementioned values.

In some embodiments, the cover 102 and/or the base 103 may be shaped such that the dispenser 100 is shaped similar to an olive. In some embodiments, the cover and/or the base 103 may be shaped such that the dispenser 100 is a cube, a prism, spherical, cylindrical, conical, and/or any other shape.

FIGS. 2A-2E illustrate embodiments of an actuation system 200 of the dispenser 100. The actuation system can include a sensor 202, a clamp 204, and an actuator 206. The sensor 202 may be placed on or coupled to the inner surface 103B-1 of the base 103. The sensor 202 may be sensor that provides a signal that correlates to a weight supported by a platform 203 upon which the container 300 is positioned. In certain embodiments, the sensor 202 is a weight sensor that produces a signal that is indicative of the weight supported on the platform 203. In some embodiments, the sensor 202 may be a load cell. In some embodiments, the sensor 202 may generate a signal that can be used to determine a weight of a fluid container 300 that is supported on the platform 203 and/or to determine the weight of weight of a fluid container 300 that is supported on the platform 203. In some embodiments, a signal from the sensor 202 may be used to determine a change of the weight of the fluid container 300 over a period of time.

Figure 2A:
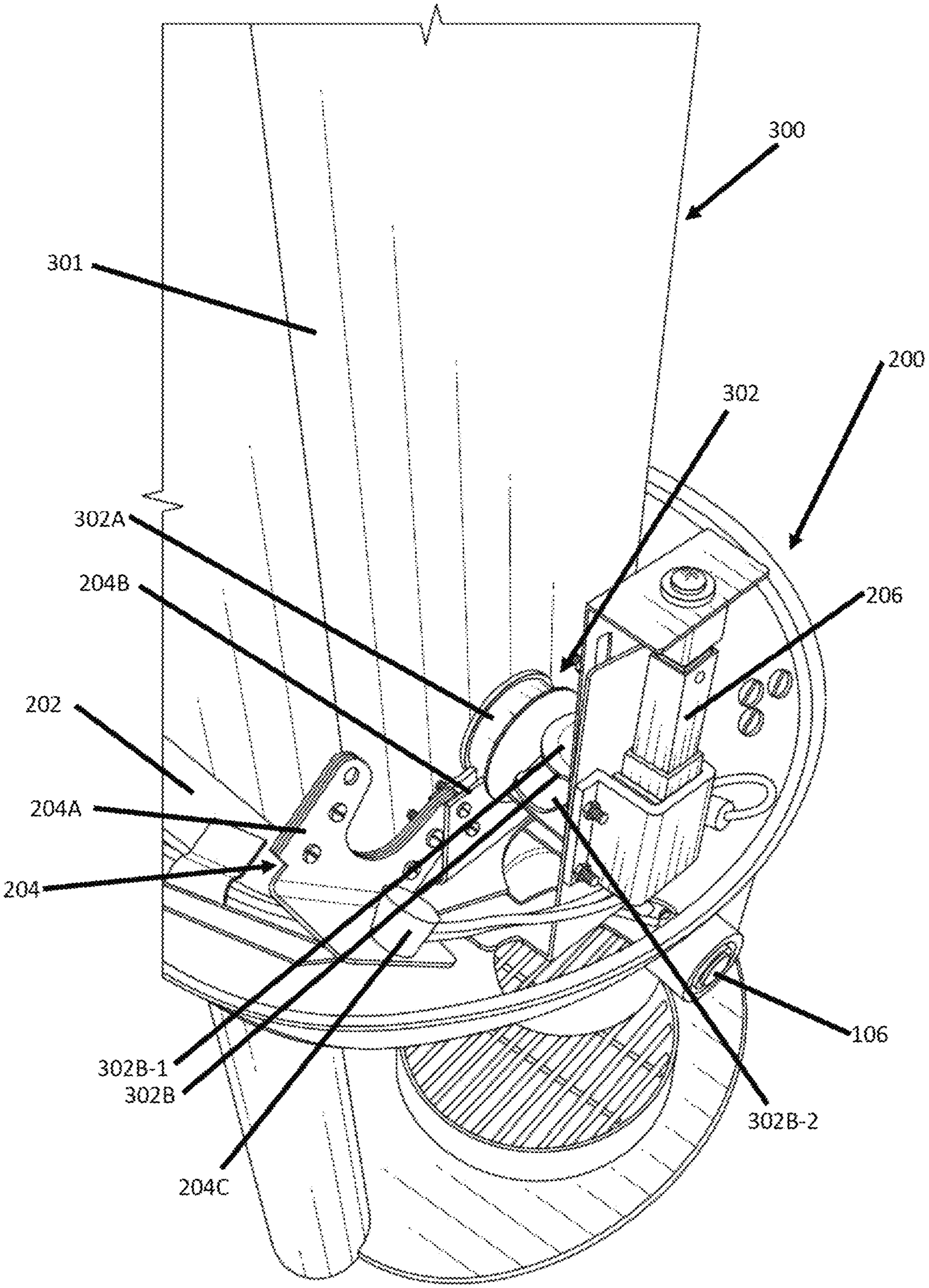
FIG. 2A illustrates an embodiment of an actuation system the dispenser of FIG. 1A.
Figure 2B:
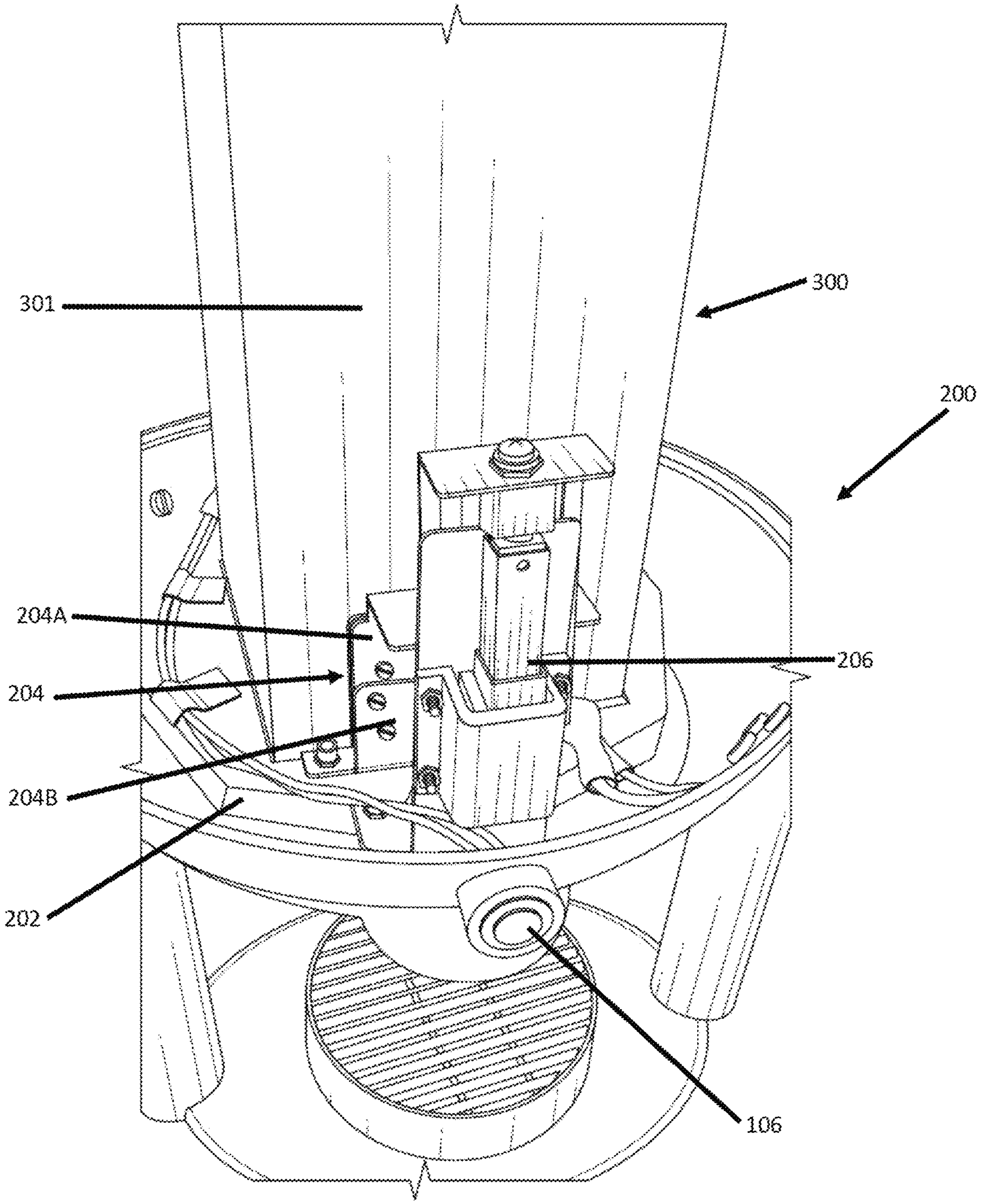
FIG. 2B illustrates another view of the actuation system shown in FIG. 2A.
Figure 2C:
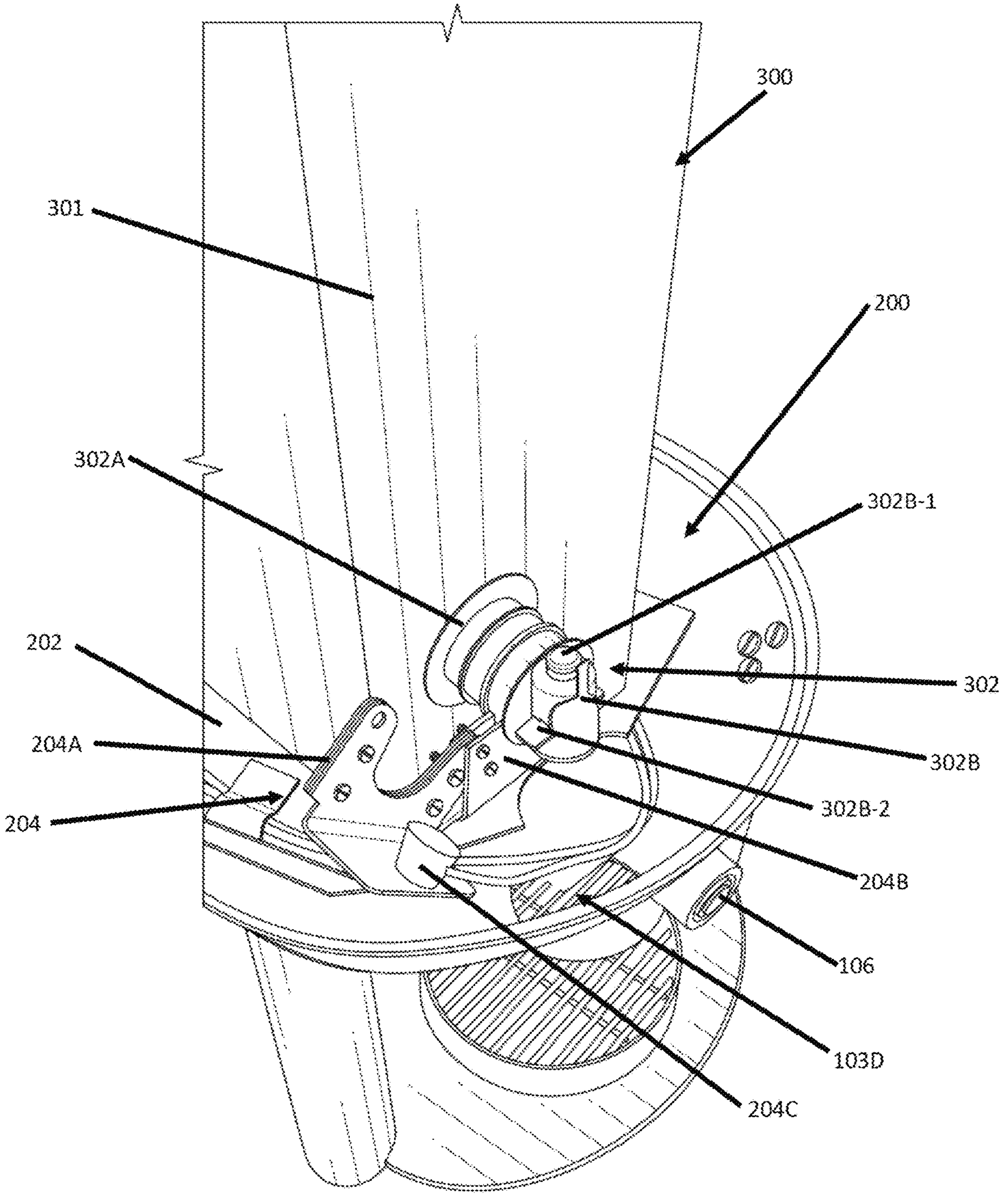
FIG. 2C illustrates another view of the actuation system shown in FIG. 2A without an actuator.

In some embodiments, the clamp 204 may secure a nozzle 302 of the fluid container to the actuation system 200. In some embodiments, the nozzle 302 may be a mechanical nozzle. In some embodiments, the nozzle 302 may be a non-mechanical nozzle such as a solenoid nozzle. In some embodiments, the nozzle 302 may be a valve. In some embodiments, the clamp 204 may include a top portion 204A and a bottom portion 204B. The bottom portion 204B may be coupled to the actuator 206 and/or the base 103 of the dispenser 100. In some embodiments, the top portion 204A may be rotatably coupled to the bottom portion 204B. In some embodiments, the top portion 204A may be removably coupled to the bottom portion 204B. The top portion 204A may be positioned in an open position, as shown in FIG. 2A, and a closed position, as shown in FIG. 2B. When the clamp 204 is in the open position, the fluid container 300 may be placed on the sensor 202 such that a portion of the nozzle 302 may rest on the bottom portion 204B. In some embodiments, a neck 302A of the nozzle 302 may rest on the bottom portion 204B. The neck 302A may be a portion of the nozzle between a fluid container body 301 and a dispensing portion 302B of the nozzle 302. In some embodiments, the neck 302A may be the portion of the nozzle 302 that extends from the fluid container 300 and coupled the nozzle 302 to the fluid container body 301. The top portion 204A and the bottom portion 204B may each include a recess 204A-1, 204B-1. The recesses 204A-1, 204B-1 may each include a surface 204A-2, 204B-2. The recesses 204A-1, 204B-1 and/or the surfaces 204A-2, 204B-2 may be shaped such that when the clamp 204 is in the closed position the recesses 204A-1, 204B-1 form an opening the same size and/or shape as the neck 302A. The recesses 204A-1, 204B-1 and/or the surfaces 204A-2, 204B-2 may be shaped such that when the clamp 204 is in the closed position the surfaces 204A-2, 204B-2 contact the neck 302A. In some embodiments, the recesses 204A-1, 204B-1 and/or the surfaces 204A-2, 204B-2 may be u-shaped. In some embodiments, the nozzle 302 may be positioned or aligned with the dispensing hole 103D and/or the actuator 206.

Once the nozzle 302 is placed on the bottom portion 204B, the user can move or rotate the top portion 204A from the open position to the closed position. In some embodiments, when the top portion 204A is in the closed position, the top portion 204A may contact a portion of the nozzle 302 such that the nozzle 302 is between the top portion 204A and the bottom portion 204B. In some embodiments, when the top portion 204A is in the closed position, the top portion 204A may contact the neck 302A such that the neck 302A is between the top portion 204A and the bottom portion 204B. In some embodiments, if a force is applied to the nozzle 302, the top portion 204A and the bottom portion 204B may secure the nozzle 302 in place such that the nozzle 302 does not move relative to the clamp 204, or in other words, the clamp 204 may provide a reaction force to the force applied to the nozzle 302 in order to keep the nozzle 302 static. In some embodiments, the reaction force applied to the nozzle 302 may be applied by the clamp 204 in a direction opposite the force applied to the nozzle 302 by the actuator 206 such that the clamp secures the nozzle 302 in place.

Figure 2D:
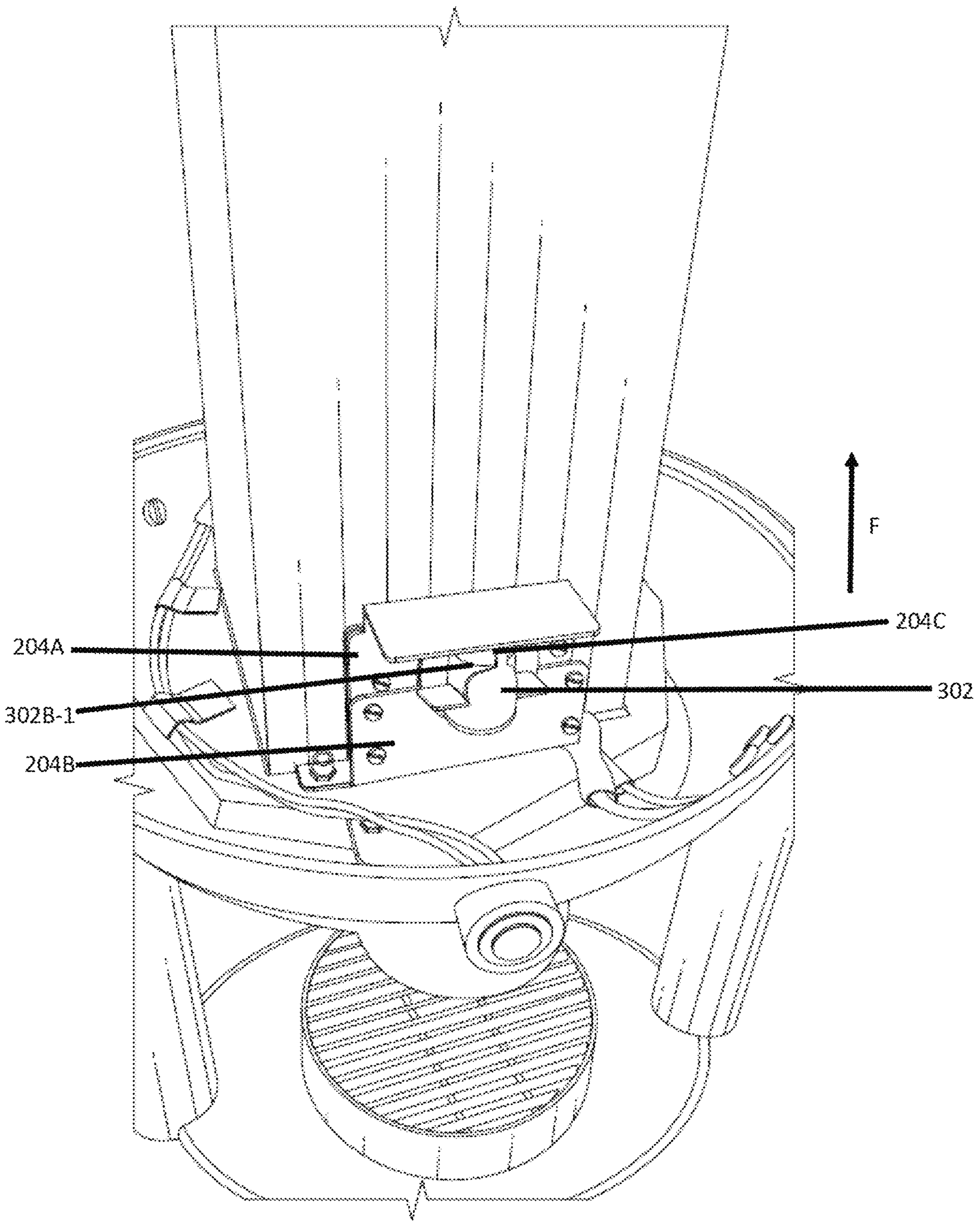
FIG. 2D illustrates another view of the actuation system shown in FIG. 2A without the actuator.
Figure 2E:
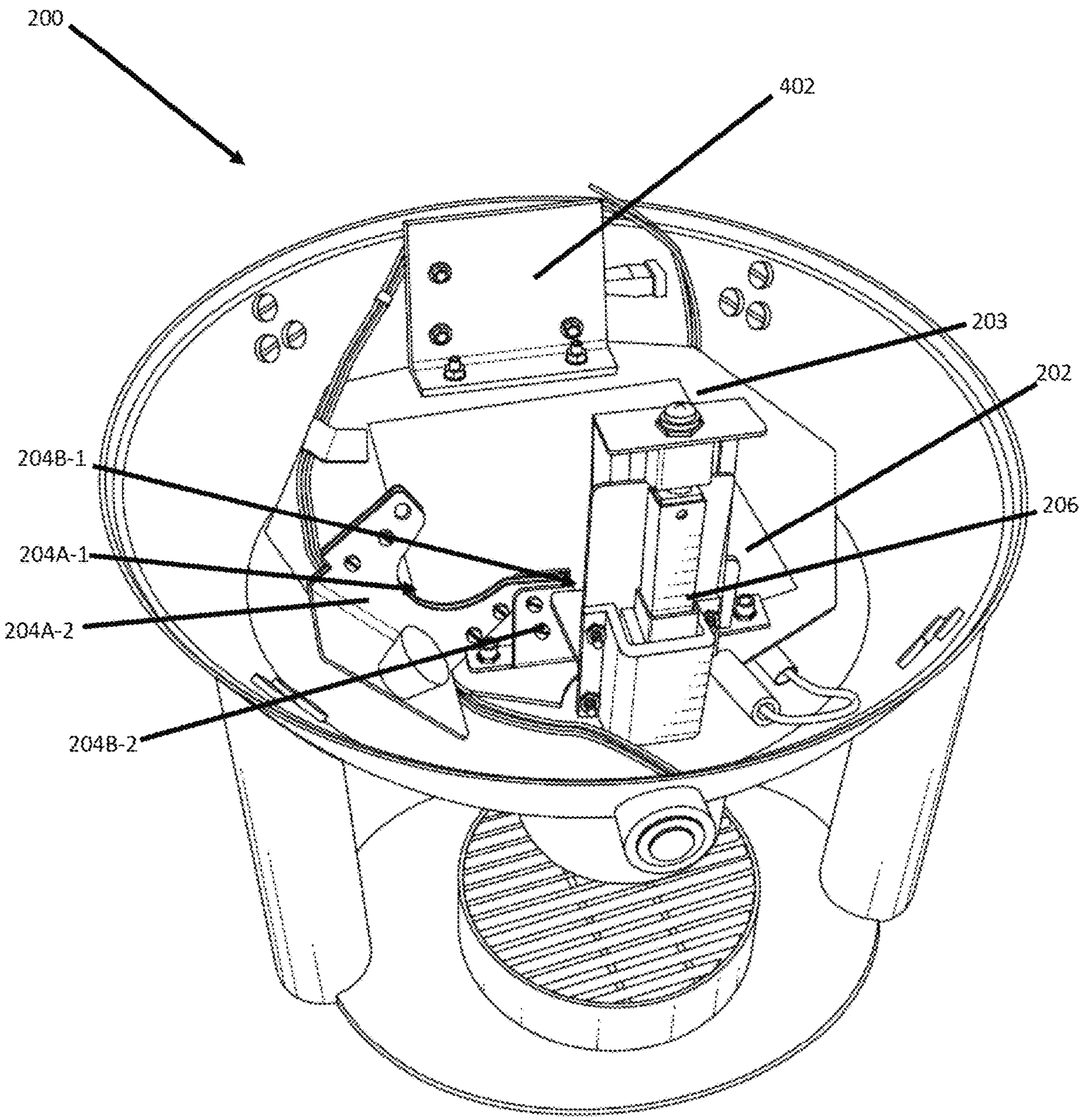
FIG. 2E illustrates another view of the actuation system shown in FIG. 2A.

In some embodiments, the clamp 204 may include a plunger 204C. In some embodiments, the plunger 204C may be configured to contact a surface 302B-1 of the dispensing portion 302B of the nozzle 302. In some embodiments, the surface 302B-1 may be a top surface of the dispensing portion 302B or any other surface of the dispensing portion 302B. In some embodiments, the plunger 204C may be coupled to the actuator 206. In some embodiments, the plunger 204C may apply a horizontal force and/or a vertical force to the dispensing portion 302B. In some embodiments, the plunger 204C may be configured to counteract a force applied to the nozzle 302 by the actuator 206 such that the nozzle 302 does not move, bend, flex, warp, and/or break when the actuator 206 applies a force to the nozzle 302. For example, as shown in FIG. 2D, if the actuator 206 applies a vertical force F, the plunger 204C may contact the dispensing portion 302B so the nozzle 302 does not move in the direction of vertical force F.

In some embodiments, the actuator 206 may be a linear actuator as shown in the illustrated embodiment. In some embodiments, the actuator 206 may be a rotary actuator. The rotary actuator may include a cam, linkage, and/or gear. In such embodiments, the cam, linkage, and/or gear may convert rotational motion of the rotary actuator into linear motion.

In some embodiments, the actuator 206 may apply a force to the dispensing portion 302B to open the nozzle 302 and dispense fluid. In some embodiments, the dispensing portion 302B can include one or more nozzle openers 302B-2 configured to open the nozzle 302 when a force is applied to the one or more nozzle openers 302B-2. The actuator 206 may apply a force to the one or more nozzle openers 302B-2. In some embodiments, the one or more nozzle openers 302B-2 may be manual actuators 302B-2. The actuator 206 may contact the manual actuators 302B-2 when the actuator 206 applies a force to the manual actuators 302B-2. In some embodiments, the actuator 206 may apply a force to the one or more nozzle openers 302B-2 in response to a user engaging the user actuator 106 of the dispenser 100. In some embodiments, the actuator 206 may apply a force to the one or more nozzle openers 302B-2 for a predetermined time to dispense a predetermined amount of fluid. In some embodiments, the predetermined time and/or the predetermined amount of fluid may not be based on how long the user engages the user actuator 106 of the dispenser 100 (i.e., the predetermined time and/or the predetermined amount of fluid may be constant). In some embodiments, the predetermined time and/or the predetermined amount of fluid may be based on how long the user engages the user actuator 106 or a number of times the user engages the user actuator 106.

In some embodiments, the predetermined time may be based on a predetermined amount of fluid. In some embodiments, the predetermined amount of fluid may be about 1 mL, about 2 mL, about 3 mL, about 4 mL, about 5 mL, about 6 mL, about 7 mL, about 8 mL, about 9 mL, about 10 mL, about 11 mL, about 12 mL, about 13 mL, about 14 mL, about 15 mL, about 16 mL, about 17 mL, about 18 mL, about 19 mL, about 20 mL, about 25 mL, about 30 mL, about 35 mL, about 40 mL, about 45 mL, about 50 mL, about 55 mL, about 60 mL, about 65 mL, about 70 mL, about 75 mL, and/or any value between the aforementioned values. In some embodiments, the predetermined amount of fluid may be greater than 75 mL. In some embodiments, the predetermined amount of fluid may be 24.7 mL.

In some embodiments, the sensor 202 may provide a signal that correlates to a weight of fluid in the fluid container 300 such that the dispenser can detect or measure a weight of the fluid in the fluid container 300. The sensor 202 may transmit single that can be indicative of the weight of the fluid in the fluid container 300 to a controller 402 (described below with reference to FIG. 2F). The sensor 202 may transmit signal that can be used to indicate the weight of the fluid in the fluid container 300 in real time or substantially real time. The sensor 202 may create a feedback loop with the controller 402.

In some embodiments, the sensor 202 may be coupled to the controller 402 and mechanically coupled to the base 103 of the dispenser 100. The fluid container 300 may be placed on the sensor 202. The sensor 202 may generate an output signal and transmit the output signal to the controller 402 responsive to a weight impressed on the sensor 202 by the fluid container 300. The sensor 202 may transmit the output signal to the controller via a wireless or a wired connection.

In some embodiments, the sensor 202 may be a load cell. The weight impressed on the sensor 202 by the fluid container 300 can cause the sensor 202 to deflect. The deflection of the sensor 202 may change an electrical resistance of a Wheatstone bridge circuit that is coupled to the sensor 202. The deflection of the sensor 202 may be proportional to the weight impressed on the sensor 202 by the fluid container 300 and/or the fluid in the fluid container 300. The output signal transmitted to the controller 402 from the sensor 202 may represent at least a portion of the weight of the fluid container 300 and/or the fluid in the fluid container 300.

In some embodiments, the controller 402 may determine the predetermined time based on the weight of the fluid in the fluid container 300. In some embodiments, the controller 402 may determine the predetermined time based on a look up table and/or a number of previous dispenses and/or from a calculation or correlation. In some embodiments, the predetermined time may be based on a density of the fluid, a viscosity of the fluid, a temperature of the fluid, an elevation, an ambient temperature around the dispenser 100, and/or any other fluid property or measurement in combination with the signal from the sensor 202. In certain embodiment, the dispenser may include a temperature and/or elevation sensor (not illustrated) and/or be in communication which such a sensor or a device that provides information the temperature or elevation.

In some embodiments, the controller 402 may automatically update and/or determine the predetermined time by comparing a change in weight of the fluid in the fluid container 300 from each of the number of previous dispenses of the predetermined time to the predetermined amount of fluid. If the change in weight of the fluid in the container 300 from the number of the previous dispenses is not within a predetermined range of the predetermined amount, the controller 402 may update the predetermined time. In some embodiments, the number of previous dispenses may be 1 dispense, 2 dispenses, 3 dispenses, 4 dispenses, 5 dispenses, 6 dispenses, 7 dispenses, 8 dispenses, 9 dispenses, 10 dispenses, 15 dispenses, 20 dispenses, and/or any value between the aforementioned values. In some embodiments, the number of previous dispenses may be greater than 20 dispenses.

In some embodiments, the controller 402 may instruct the actuator 206 to open the nozzle 302 for the predetermined time. In some embodiments, the controller 402 may instruct the actuator 206 to open the nozzle 302 when a user engages the user actuator 106 of the dispenser 100. In some embodiments, the controller 402 may instruct the actuator 206 to close the nozzle 302 after the predetermined time. In some embodiments, the controller 402 may instruct the actuator to close the nozzle 302 when a change in the weight of the fluid in the fluid container 300 is equal to the predetermined amount of fluid. In some embodiments, the controller 402 may be configured to dispense an amount of fluid within a percent error of the predetermined amount. The percent error may be 1 percent, 2 percent, 3 percent, 4 percent, 5 percent, 6 percent, 7 percent, 8 percent, 9 percent, 10 percent, 11 percent, 12 percent, 13 percent, 14 percent, 15 percent, 16 percent, 17 percent, 18 percent, 19 percent, 20 percent, and/or any value between the aforementioned values.

Figure 4:
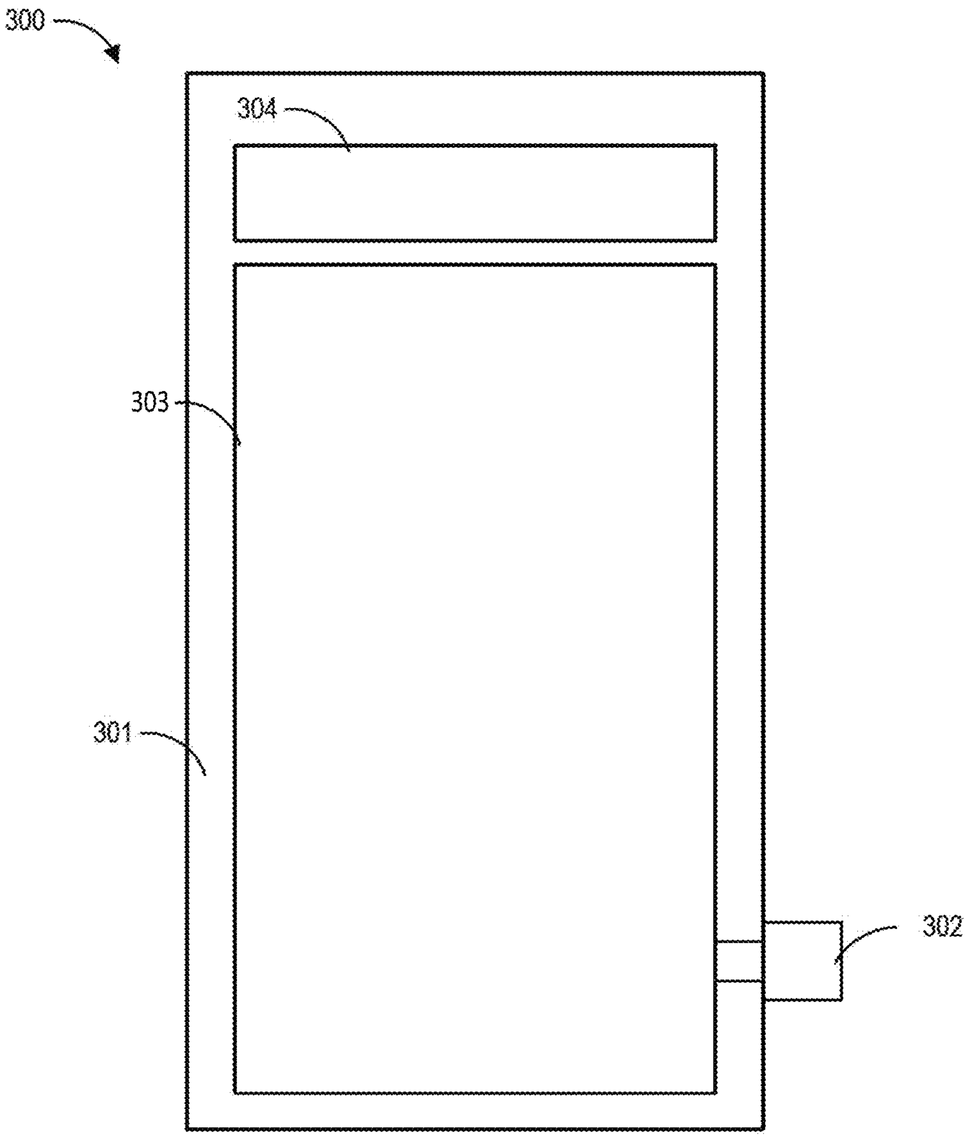
FIG. 4 schematically illustrates an embodiment of a fluid container.

In some embodiments, the nozzle 302 may be a tap valve, a pinch valve, a ball valve, a butterfly valve, a diaphragm valve, a gate valve, a piston valve, and plug valve, and/or any other type of valve. In some embodiments, fluid container 300 and/or the fluid container body 301 may be a bag-in-box fluid. In some embodiments, the fluid container 300 may be a gravity fed fluid container 300. In some embodiments, as shown schematically in FIG. 4, a weight 304 may be placed on the bag 303. The weight 304 may provide a force or pressure on the bag 303 to increase a flow rate of fluid through the nozzle 302 and/or increase a consistency of the flow rate of fluid through the nozzle 302 as an amount of fluid in the bag 303 decreases. In some embodiments the force may be a static force. In some embodiments, the force or pressure provided by the weight 304 may instead be provided by linear or nonlinear spring coupled to a lid or top of the fluid container body 301.

Figure 2F:
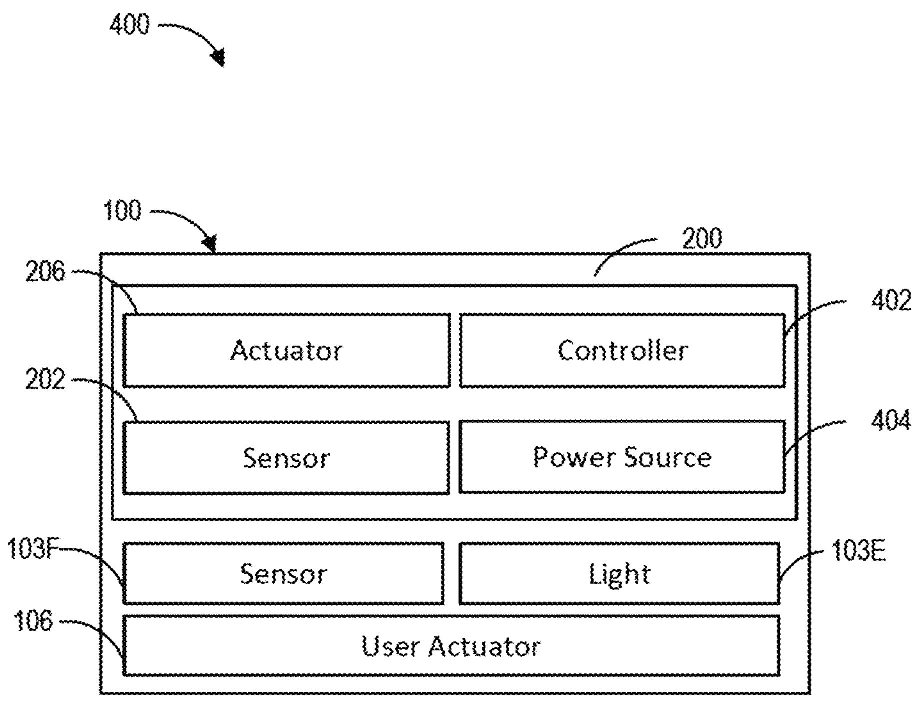
FIG. 2F schematically illustrates an embodiment of a control system of an embodiment of a dispenser.

FIG. 2F illustrates a schematic of an embodiment of a control system 400 of a dispenser 100. The control system 400 may include the user actuator 106, the actuator 206, the sensor 202, the controller 402, a power source 404, light 103E and/or sensor 103F. In some embodiments, the light 406 may be the light as described with reference to FIGS. 1A-1C.

In some embodiments the user actuator 106 may be a user interface. The user interface may be coupled to the dispenser 100 via a wired connection and/or a wireless connection. In some embodiments, the user interface may be coupled to the dispenser 100 a distance from the dispenser 100. In some embodiments, the distance may be 5 inches, 10 inches, 15 inches, 20 inches, 25 inches, 30 inches, 35 inches, 40 inches, 45 inches, 50 inches, and/or any value between the aforementioned values. In some embodiments, the distance may be between 33 inches and 49 inches. In some embodiments, the distance may be about 40 inches. In some embodiments the distance may be a vertical distance from the distal end 104A-2 of the legs 104A, and the user interface may be coupled to the cover 102.

In some embodiments, the controller 402 may control the sensor 202, the actuator 206, the light 103E, the sensor 103F, and/or any of the functions of the dispenser 100 or the actuation system 200 as described with reference to FIGS. 1A-3.

In some embodiments, the power source 404 may be a battery (e.g., rechargeable battery or replaceable battery). In some embodiments, the power source 404 may be an inductive power source 404 such that the power source 404 may be charged or powered wirelessly. In some embodiments, the power source 404 may be a wired connection to an outlet. The power source 34 may supply power to the user actuator 106, the actuator 206, the sensor 202, the controller 402, a power source 404, and/or a light 406.

In some embodiments, the sensor 202 may be multiple sensors. In some embodiments, the sensor 202 may include a weight sensor, a temperature sensor, an elevation sensor, and/or any other sensor.

Figure 3:
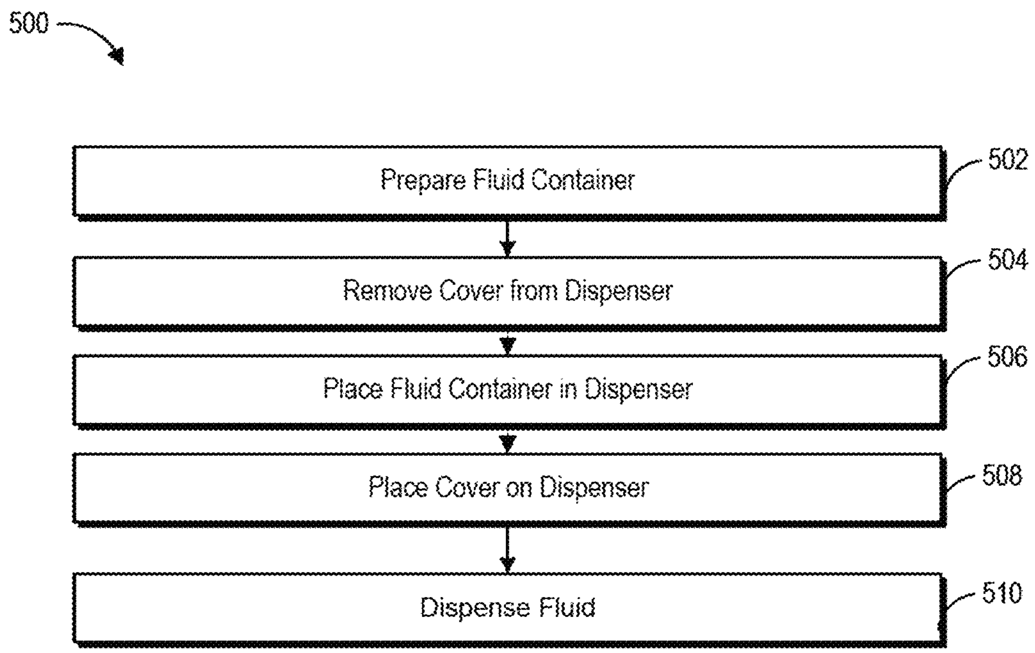
FIG. 3 schematically illustrates a method of using a dispenser.

FIG. 3 illustrates a schematic of a method 500 of using a dispenser 100. In some embodiments, a user may prepare a fluid container 300 at step 502. In some embodiments, the fluid container 300 may be a bag-in-box container. The user may pull the nozzle 302 of the fluid container 300 out of the fluid container body 301.

In some embodiments, at step 504, the user may remove the cover 102 of the dispenser 100. In some embodiments, the user may lift the cover 102 off the base 103 and/or the ring 104B of the dispenser 100. In some embodiments, the user may remove each of the halves 102A, 120B of the dispenser 100.

In some embodiments, at step 506, the user may place the fluid container 300 in the dispenser 100. In some embodiments, the user may place the fluid container body 301 on the sensor 202 of the actuation system 200. In some embodiments, the user may place the fluid container 300 in the dispenser 100 so the nozzle 302 is substantially aligned with the dispensing hole 103D, the actuator 206, and/or the clamp 204. The clamp 204 may be in the open position when the user places the fluid container 300 in the dispenser 100. The user may move the clamp 204 from the open position to the closed position. In some embodiments, the user may open the fluid container body 301 and place a weight 304 on a bag 303 of the fluid container 300 as shown schematically in FIG. 4.

In some embodiments, at step 508 the user can place the cover 102 on the dispenser 100. The user may place the cover 102 and/or the halves 102A, 102B of the cover 102 on the base 103 and/or the ring 104B such that the cover 102 covers the fluid container 300.

In some embodiments, at step 510 the user may dispense fluid. The user may engage the user actuator 106. In response to the user engaging the user actuator 106 the controller 402 may instruct the actuator 206 to open the nozzle 302. In some embodiments, the controller 402 may instruct the actuator 206 to open the nozzle 302 for a predetermined time. In some embodiments, the controller 402 may instruct the actuator 206 to close the nozzle 302 a predetermined time after the controller 402 instructs the actuator to open the nozzle 302. In some embodiments, the actuator 206 may instruct the actuator to close the nozzle 302 after the sensor 202 detects a change in weight of the fluid in the fluid container 300. The controller may determine the predetermined time and/or the change in weight of the fluid in the fluid container 300 based on a predetermined amount of fluid such that the dispenser 100 dispenses the predetermined amount of fluid when the user engages the user actuator 106. In some embodiments, before the user engages the user actuator 106 at step 510, the user may place a beverage container below the dispensing hole 103D such that the beverage container receives the predetermined amount of fluid.

Certain Terminology

As used herein, the term "beverage" has its ordinary and customary meaning, and includes, among other things, any edible liquid or substantially liquid substance or product having a flowing quality (e.g., juices, coffee beverages, teas, milk, beer, wine, cocktails, liqueurs, spirits, cider, soft drinks, flavored water, energy drinks, soups, broths, combinations of the same, or the like).

As used herein, the term "fluid" has its ordinary and customary meaning, and includes, among other things, any viscous, inviscid, viscoelastic, compressible, or incompressible fluids (e.g., juices, coffee beverages, teas, milk, beer, wine, cocktails, liqueurs, spirits, cider, soft drinks, flavored water, energy drinks, soups, broths, olive oil, gases, toothpaste, or the like).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. Numbers preceded by a term such as "about" or "approximately" include the recited numbers and should be interpreted based on the circumstances (e.g., as accurate as reasonably possible under the circumstances, for example. For example, "about 1 gram" includes "1 gram." In the embodiments described in this application, terms such as "about" or "approximately" within the specification or claims that precede values or ranges can be omitted such that this application specifically includes embodiments of the recited values or ranges with the terms "about" or "approximately" omitted from such values and ranges such that they can also be claimed without the terms "about" or "approximately" before the disclosed range. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

The following example embodiments identify some possible permutations of combinations of features disclosed herein, although other permutations of combinations of features are also possible.

SUMMARY

Although certain aspects, advantages, and features are described herein, it is not necessary that any particular embodiment include or achieve any or all of those aspects, advantages, and features. For example, some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable. In addition, although this disclosure describes certain embodiments and examples of beverage systems and methods, many aspects of the above-described systems and methods may be combined differently and/or modified to form still further embodiments or acceptable examples. All such modifications and variations are intended to be included herein within the scope of this disclosure.

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Some embodiments have been described in connection with the accompanying drawings. The figures are drawn to scale, but such scale should not be interpreted to be limiting. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Also, any methods described herein may be practiced using any device suitable for performing the recited steps.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of fluid dispensing systems and methods have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. A fluid dispenser, comprising:

a first actuator;

a second actuator; and a sensor, wherein the sensor provides a signal that relates to a fluid in a fluid container, wherein when a user engages the first actuator, the second actuator is configured to actuate a manual actuator of a mechanical nozzle of the fluid container to open the mechanical nozzle for a period of time to dispense, through a hole in the fluid dispenser, a predetermined amount of the fluid from the fluid container, wherein the period of time is based on the signal from the sensor.

2. The fluid dispenser of claim 1, wherein the second actuator is a linear actuator.

3. The fluid dispenser of claim 1, wherein the second actuator applies a force to the mechanical nozzle to open the mechanical nozzle.

4. The fluid dispenser of claim 3, further comprising a clamp configured to secure the mechanical nozzle in place when the second actuator applies the force to the mechanical nozzle.

5. The fluid dispenser of claim 1, wherein a controller determines the period of time.

6. The fluid dispenser of claim 1, wherein the sensor is a weight sensor, and the signal relates to a weight of the fluid in the fluid container.

7. The fluid dispenser of claim 6, wherein a controller determines the period of time based on a look up table comprising weights of the fluid in the fluid container.

8. The fluid dispenser of claim 6, wherein a controller determines the period of time based on a first weight of the fluid in the fluid container and a second weight of the fluid in the fluid container, wherein the first weight of the fluid in the fluid container is the weight of the fluid in the fluid container before the second actuator opens the mechanical nozzle, and the second weight of the fluid in the fluid container is the weight of the fluid in the fluid container after the mechanical nozzle dispenses the predetermined amount of the fluid.

9. A fluid dispensing system, comprising:
- a housing configured to receive a fluid container comprising a mechanical nozzle, the housing comprising:
  - a first actuator, wherein the first actuator is a mechanical actuator;
  - a base comprising a hole;
  - a cover coupled to the base,
  - wherein when the housing receives the fluid container, the mechanical nozzle is substantially aligned with the hole;
- an actuation system comprising:
  - a controller;
  - a second actuator; and
  - a sensor, wherein the sensor provides a signal that relates to a fluid in the fluid container;
- wherein when a user engages the first actuator, the controller is configured to instruct the second actuator to apply a force to the mechanical nozzle for a period of time, wherein the force opens the mechanical nozzle to dispense a predetermined amount of the fluid from the fluid container, wherein the controller is configured to determine the period of time based the signal from the sensor.

10. The fluid dispensing system of claim 9, further comprising a clamp configured to secure the mechanical nozzle in place when the second actuator applies the force to the mechanical nozzle.

11. The fluid dispensing system of claim 9, wherein the period of time is not based on how long the user engages the first actuator.

12. The fluid dispensing system of claim 9, wherein the sensor is a weight sensor, and the signal relates to a weight of the fluid in the sensor.

13. The fluid dispensing system of claim 9, wherein the controller determines the period of time based on a look up table comprising weights of the fluid in the container.

14. The fluid dispensing system of claim 9, wherein the controller determines the period of time based on a first weight of the fluid in the fluid container and a second weight of the fluid in the fluid container, wherein the first weight of the fluid in the fluid container is the weight of the fluid in the fluid container before the second actuator opens the mechanical nozzle, and the second weight of the fluid in the fluid container is the weight of the fluid in the fluid container after the mechanical nozzle dispenses the predetermined amount of fluid.

15. The fluid dispensing system of claim 9, wherein the fluid container is a bag-in-box container.

16. A method of dispensing a predetermined amount of a fluid, comprising:
- placing, by a user, a fluid container on a weight sensor coupled to a base of a dispenser, wherein the fluid container comprises a mechanical nozzle, and the base comprises a hole;
- aligning, by the user, the mechanical nozzle with the hole and an electronic actuator of the dispenser;
- closing, by the user, a clamp configured to secure the mechanical nozzle in place;
- engaging, by the user, a mechanical actuator of the dispenser;
- determining, by a controller, a period of time, wherein the period of time is based on a weight of the fluid in the fluid container detected by the weight sensor, and the predetermined amount of the fluid;
- instructing, by the controller, the electronic actuator to apply a force to the mechanical nozzle to open the mechanical nozzle and dispense the fluid; and
- after the period of time, instructing, by the controller, the electronic actuator to stop applying the force to the mechanical nozzle to close the mechanical nozzle.

17. The method of claim 16, wherein the controller determines the period of time based on a look up table.

18. The method of claim 16, wherein the controller determines the period of time based on a first weight of the fluid in the fluid container and a second weight of the fluid in the fluid container, wherein the first weight of the fluid in the fluid container is the weight of the fluid in the fluid container before the electronic actuator opens the mechanical nozzle, and the second weight of the fluid in the fluid container is the weight of the fluid in the fluid container after the mechanical nozzle dispenses the predetermined amount of fluid.

19. The method of claim 16, wherein the fluid container is a bag-in-box container.

20. The method of claim 19, wherein the user places a weight on a bag of the bag-in-box container.

* * * * *